(12) United States Patent  
Selvaganapathy et al.

(10) Patent No.: US 11,350,320 B2  
(45) Date of Patent: May 31, 2022

(54) PREPARATION OF MULTIPLE TARGET CELLS FOR A HANDOVER IN A WIRELESS COMMUNICATION NETWORK

(71) Applicant: Nokia Solutions and Networks Oy, Espoo (FI)

(72) Inventors: Srinivasan Selvaganapathy, Bangalore (IN); Krzysztof Kordybach, Pulawy (PL); Ahmad Awada, Munich (DE); Jedrzej Stanczak, Wroclaw (PL); Subramanya Chandrashekar, Bangalore (IN); Ingo Viering, Munich (DE)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 16/988,786

(22) Filed: Aug. 10, 2020

(65) Prior Publication Data

US 2021/0051535 A1 Feb. 18, 2021

(30) Foreign Application Priority Data

Aug. 14, 2019 (IN) .............................. 201941032941

(51) Int. Cl.  
*H04W 36/00* (2009.01)  
*H04W 36/08* (2009.01)

(52) U.S. Cl.  
CPC ... *H04W 36/0055* (2013.01); *H04W 36/0016* (2013.01); *H04W 36/08* (2013.01)

(58) Field of Classification Search  
CPC ......... H04W 36/0055; H04W 36/0005; H04W 36/0009; H04W 36/0011; H04W 36/0027;  
(Continued)

(56) References Cited

U.S. PATENT DOCUMENTS

| | | | | |
|---|---|---|---|---|
| 9,743,329 | B2* | 8/2017 | Xiao | ................. H04W 36/0069 |
| 2012/0100855 | A1* | 4/2012 | Zhang | .................... H04L 45/26 |
| | | | | 455/436 |

(Continued)

FOREIGN PATENT DOCUMENTS

| | | | |
|---|---|---|---|
| CN | 102333352 B | * | 3/2014 |
| CN | 102333352 B | | 3/2014 |

(Continued)

OTHER PUBLICATIONS

"3rd Generation Partnership Project; Technical Specification Group Radio Access Network; Evolved Universal Terrestrial Radio Access Network (E-UTRAN); X2 application protocol (X2AP) (Release 15)", 3GPP TS 36.423, V15.6.0, Jul. 2019, pp. 1-421.

(Continued)

*Primary Examiner* — Keith Ferguson  
(74) *Attorney, Agent, or Firm* — Nokia Technologies Oy

(57) ABSTRACT

According to an example aspect of the present invention, there is provided a method comprising, determining, by a source base station, a first target cell and a second target cell for a handover of a user equipment, wherein the first target cell and the second target cell are cells of the same target base station, setting, by the source base station, an identifier of a first handover preparation procedure and an identifier of a second handover preparation procedure, wherein the identifier of the first handover preparation procedure is different compared to the identifier of the second handover preparation procedure, initializing, by the source base station, the first handover preparation procedure to the first target cell and the second handover preparation procedure to the second target cell and binding, by the source base station, the identifier of the first handover preparation procedure and the identifier of the second handover preparation procedure.

19 Claims, 7 Drawing Sheets

(58) Field of Classification Search
CPC ............. H04W 36/0033; H04W 36/00; H04W 36/0016; H04W 36/0061; H04W 36/0072; H04W 36/08; H04W 36/00835; H04W 36/0088; H04W 36/0094
See application file for complete search history.

(56) References Cited

U.S. PATENT DOCUMENTS

| | | | | |
|---|---|---|---|---|
| 2013/0183970 | A1* | 7/2013 | Chen | ............... H04W 36/30 455/436 |
| 2013/0196666 | A1* | 8/2013 | Zhang | ............ H04W 36/0005 455/436 |
| 2014/0094168 | A1 | 4/2014 | Aikawa | |
| 2014/0321433 | A1* | 10/2014 | Xiao | .................. H04B 7/24 370/332 |
| 2015/0373602 | A1* | 12/2015 | Hampel | ............ H04W 36/0016 455/437 |
| 2017/0195925 | A1* | 7/2017 | Nishikawa | ............ H04W 36/08 |

FOREIGN PATENT DOCUMENTS

| | | | | |
|---|---|---|---|---|
| EP | 2941082 | A1 | 11/2015 | |
| EP | 3133856 | A1 * | 2/2017 | ............ H04W 92/20 |
| WO | WO-2012041044 | A1 * | 4/2012 | ............ H04W 36/30 |
| WO | WO-2012058966 | A1 * | 5/2012 | ........ H04W 36/0044 |
| WO | WO-2012142823 | A1 * | 10/2012 | ............ H04W 36/08 |
| WO | 2014/161161 | A1 | 10/2014 | |
| WO | WO-2014161161 | A1 * | 10/2014 | ............ H04W 36/14 |
| WO | WO-2020197459 | A1 * | 10/2020 | ............ H04W 36/34 |

OTHER PUBLICATIONS

"3rd Generation Partnership Project; Technical Specification Group Radio Access Network; NG-RAN; Xn application protocol (XnAP) (Release 15)", 3GPP TS 38.423, V15.4.0, Jul. 2019, pp. 1-309.

International Search Report and Written Opinion received for corresponding Patent Cooperation Treaty Application No. PCT/FI2020/050522, dated Nov. 9, 2020, 13 pages.

"Clarification of UE X2AP/XnAP ID for Multiple Transactions in Conditional Handover", 3GPP TSG-RAN WG3 #107-e, R3-200677, Agenda : 15.3.1.2, Samsung, Feb. 24-Mar. 6, 2020, 3 pages.

"Data Forwarding Configuration in Parallel Transactions to Multiple Target Cells in the same Target Node", 3GPP TSG-RAN WG3 #107-e, R3-200681, 15.4.1.2, Samsung, Feb. 24-Mar. 6, 2020, 3 pages.

* cited by examiner

PREPARATION OF MULTIPLE TARGET CELLS FOR A HANDOVER IN A WIRELESS COMMUNICATION NETWORK

RELATED APPLICATION

This application claims priority from India provisional Application No. 201941032941 filed 14 Aug. 2019, which is hereby incorporated in its entirety.

FIELD

Various example embodiments relate in general to wireless communication networks and more specifically, to preparation of multiple target cells for a handover in such networks.

BACKGROUND

Mobility of wireless terminals, such as User Equipment, UEs, needs to be enabled in various wireless communication networks and handovers may be exploited for ensuring that a wireless terminal may move without experiencing significant connectivity issues. For instance, mobility is very important for cellular networks, such as for networks operating according to Long Term Evolution, LTE, and/or 5G radio access technology. 5G radio access technology may also be referred to as New Radio, NR, access technology. Since its inception, LTE has been widely deployed and 3rd Generation Partnership Project, 3GPP, still develops LTE. Similarly, 3GPP also develops standards for 5G/NR. One of the topics in the 3GPP discussions is related to handovers and according to the discussions there is a need to provide improved methods, apparatuses and computer programs for preparation of multiple target cells for handovers.

SUMMARY

According to some aspects, there is provided the subject-matter of the independent claims. Some embodiments are defined in the dependent claims. The embodiments and features, if any, described in this specification that do not fall under the scope of the independent claims are to be interpreted as examples useful for understanding various embodiments of the invention.

EMBODIMENTS

Figure 1:
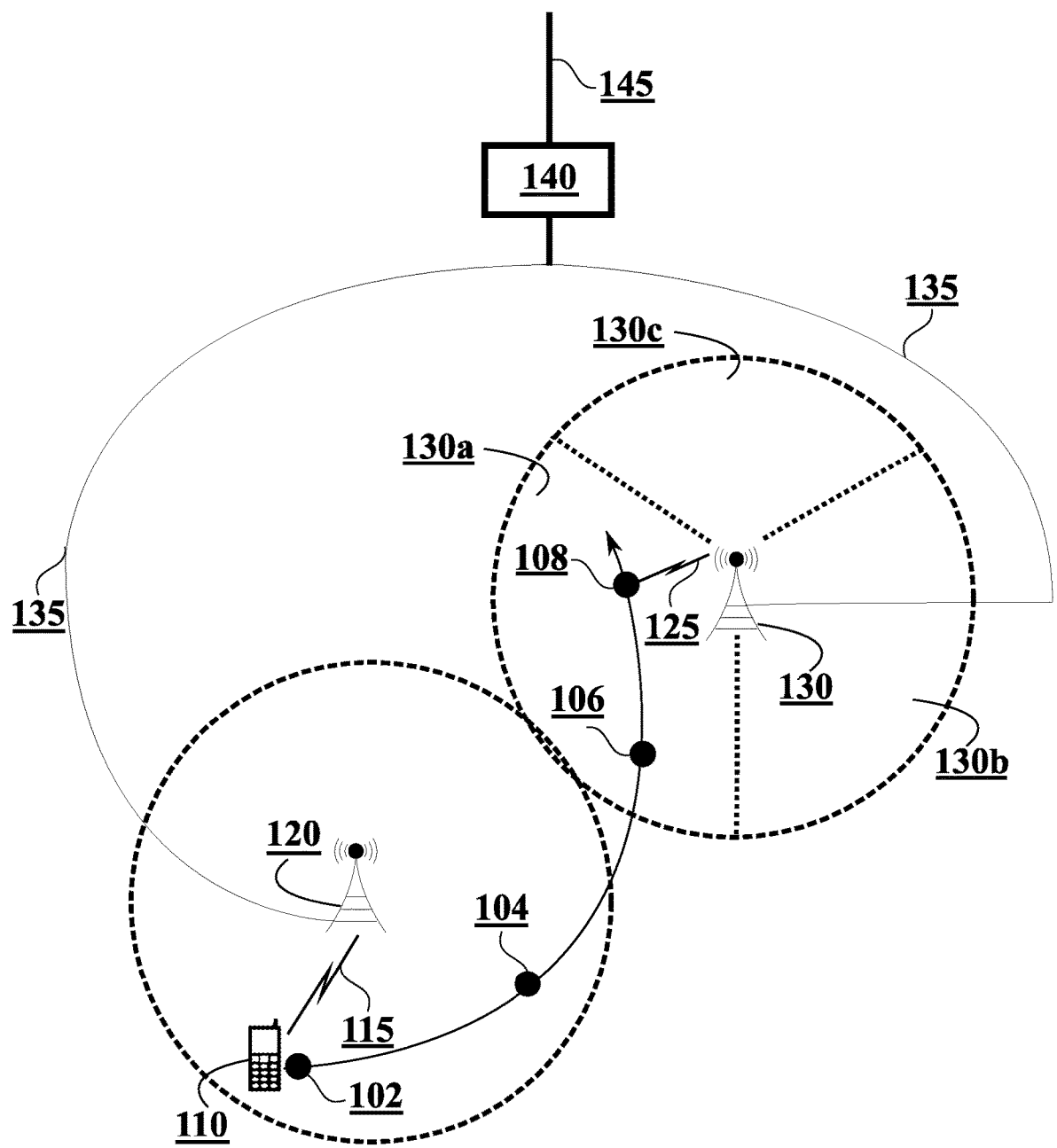
FIG. 1 illustrates an exemplary communication network in accordance with at least some embodiments.

Preparation of multiple target cells of the same target Base Station, BS, for a handover may be enabled by the procedures described herein. For example, a source BS may initialize a first handover preparation procedure for a first target cell of the target BS and a second handover preparation procedure for a second target cell of the target BS. The first handover preparation procedure and the second handover preparation procedure may be for the same User Equipment, UE.

The source BS may set an identifier of the first handover preparation procedure and an identifier of the second handover preparation procedure. If the identifier of the first handover preparation procedure is set as different than the identifier of the second handover preparation procedure, the source BS may bind the identifier of the first handover preparation procedure and the identifier of the second handover preparation procedure. Thus, the source BS may associate the identifier of the first handover preparation procedure with the first target cell and the UE, and the identifier of the second handover preparation procedure with the second target cell and the UE. The binding between the identifier of the first handover preparation procedure and the identifier of the second handover preparation procedure may be used, for example, by the source BS to select a forwarding tunnel for forwarding data of the user during a handover.

On the other hand, if the identifier of the first handover preparation procedure is set as the same as the identifier of the second handover preparation procedure, the target BS may bind the identifier of the first handover preparation procedure and the identifier of the second handover preparation procedure. Thus, the target BS may associate the identifier of the first handover preparation procedure with the first target cell and the UE, and the identifier of the second handover preparation procedure with the second target cell and the UE. In this case the identifier used by the target BS to distinguish between different handover preparation procedures may be a cell identifier. The binding between the identifier of the first handover preparation procedure and the identifier of the second handover preparation procedure may be used, for example, by the target BS to determine a context of the UE. In general, the context of UE 110 may comprise for example an identity, mobility state or user security parameters of UE 110.

In general, binding of the identifier of the first handover preparation procedure and the identifier of the second handover preparation procedure may refer to associating the identifier of the first handover preparation procedure and the identifier of the second handover preparation procedure with the UE. In other words, context of the UE and/or handover context may be bound to the identifiers of the first and second handover preparation procedures. Moreover, the identifier of the first handover preparation procedure may be associated with a first target cell and the identifier of the second handover preparation procedure may be associated with a second target cell. So for example the source BS may know that the target cells are for the same UE and the target cells belong to the same target BS, and select the forwarding tunnel accordingly.

FIG. 1 illustrates an exemplary communication network in accordance with at least some embodiments. The exemplary communication network of FIG. 1 may comprise a wireless communication system, which may further comprise UE 110, source BS 120 and target BS 130. Source BS 120 may also comprise, or be associated with, at least one cell. Target BS 130 may comprise, or be associated with, at least three cells, such as cells 130a, 130b and 130c.

Cells 130a and 130b may be target cells for a handover of UE 110, for a conditional handover for example. Source BS 120 may be a source BS for the handover of UE 110 while target BS 130 may be a target BS for the handover of UE 110. Thus, a cell of source BS 120 may be referred to as a source cell for the handover. The exemplary communication network may also comprise core network 140.

Locations of UE 110 at different time instants are denoted by points 102, 104, 106 and 108 in FIG. 1. UE 110 may be located at point 102 before the handover and be connected to source BS 120 via air interface 115. Then, UE 110 may start moving from point 102 towards target BS 130 via points 104 and 106. At point 108, UE 110 may have performed the handover. Thus, at point 108 UE 110 may be connected to target BS via air interface 125.

Source BS 120 and target BS 130 may be connected to each other directly via wired interface 135, such as a X2 or Xn interface. Source BS 120 and target BS 130 may be connected, directly or via at least one intermediate node, with core network 140 as well. Core network 140 may be, in turn, coupled via wired interface 145 with another network (not shown in FIG. 1), via which connectivity to further networks may be obtained, for example via a worldwide interconnection network. Source BS 120 and target BS 130 may be connected with at least one other BS as well via at least one inter-BS interface (not shown in FIG. 1), even though in some example embodiments the at least one inter-BS interface may be absent.

UE 110 may comprise, for example, a smartphone, a cellular phone, a Machine-to-Machine, M2M, node, Machine-Type Communications node, MTC, an Internet of Things, IoT, node, a car telemetry unit, a laptop computer, a tablet computer or, indeed, any kind of suitable mobile wireless terminal or station. In some example embodiments, source BS 120 may be considered as a serving BS for UE 110 before the handover while target BS 130 may be considered as a serving BS for UE 110 after the handover.

Air interface 115 between UE 110 and source BS 120 may be configured in accordance with a first Radio Access Technology, RAT, which UE 110 and source BS 120 are configured to support, and UE 110 may communicate with source BS 120 via air interface 115 using the first RAT before the handover. Similarly, air interface 125 between UE 110 and target BS 130 may be configured in accordance with a second RAT, which UE 110 and target BS 130 are configured to support, and UE 110 may communicate with target BS 130 via air interface 125 using the second RAT after the handover.

The first RAT and the second RAT may, or may not, be the same. That is to say, the handover may be an intra-RAT or inter-RAT handover. Examples of cellular RATs include Long Term Evolution, LTE, New Radio, NR, which may also be known as fifth generation, 5G, radio access technology and MulteFire. For instance, in the context of LTE, a BS may be referred to as eNB while in the context of NR, a BS may be referred to as gNB. In any case, embodiments are not restricted to any particular wireless technology. Instead, embodiments may be exploited in any wireless communication system wherein it is desirable to prepare multiple target cells for a handover, such as a conditional handover.

Figure 2:
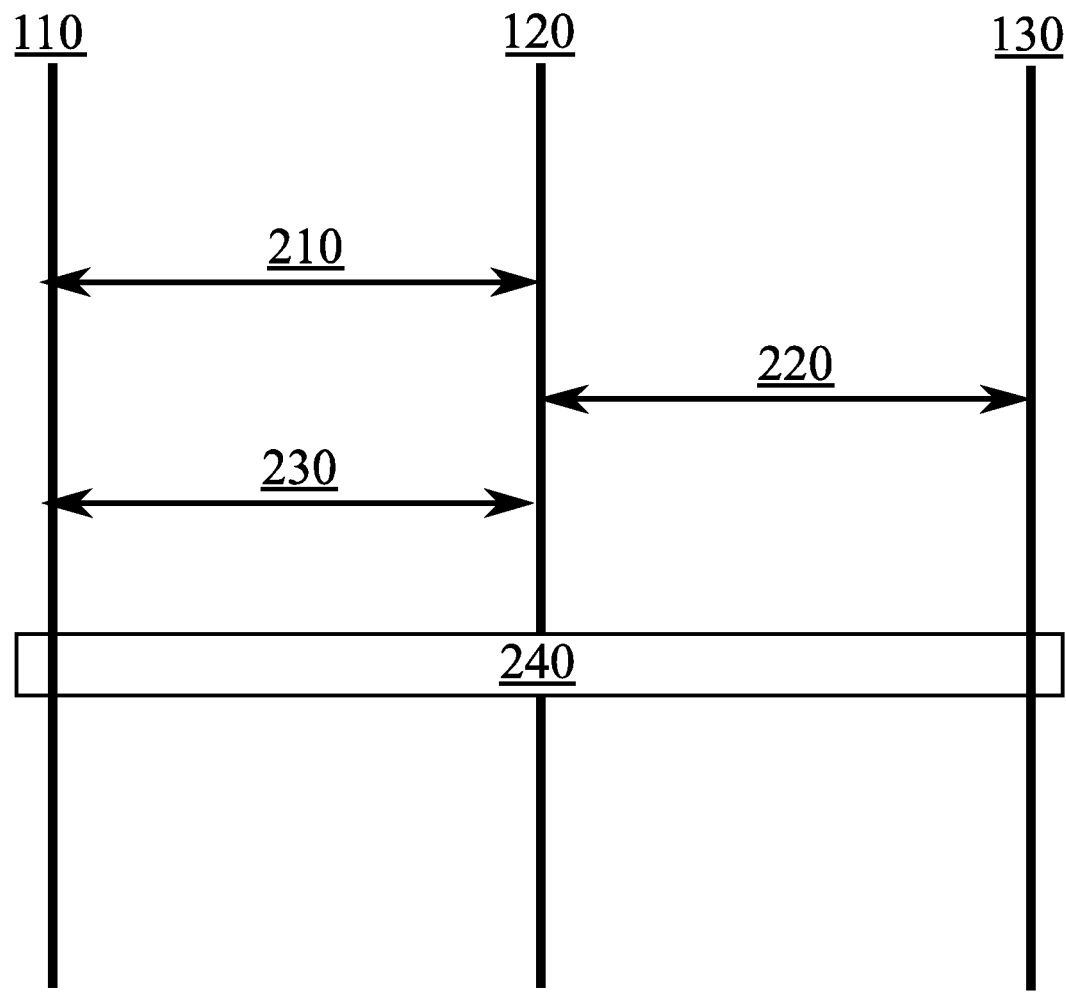
FIG. 2 illustrates an example of a conditional handover in accordance with at least some embodiments.

FIG. 2 illustrates an example of a conditional handover in accordance with at least some embodiments. On the vertical axes are disposed, from the left to the right, UE 110, source BS 120 and target BS 130 of FIG. 1. At step 210, source BS 120 may request, or command, UE 110 to perform measurements and in response, UE 110 may perform measurements and transmit at least one measurement result to source BS 120 in a measurement report.

Upon receiving the at least one measurement result, source BS 120 may transmit a handover preparation request to target BS 130 at step 220. Responsive to receiving the handover preparation request, target BS 130 may transmit to source BS 120 an acknowledgment to accept the handover preparation request or rejection message to reject the handover preparation request at step 220 as well.

If the handover preparation request is accepted, a handover command may be transmitted to UE 110 by source BS 120 at step 230, i.e., during preparation of the conditional handover but before executing the conditional handover. The handover command may be provided along with a condition for executing the conditional handover and the handover command may comprise a list of target cells prepared for the conditional handover. With reference to FIG. 1 again, the list of target cells prepared for the conditional handover may comprise for example first target cell 130a and second target cell 130b of target BS 130. In response to receiving the handover command, UE 110 may acknowledge the handover command at step 230 and measure the target cells to determine, or check, whether the condition for executing the conditional handover is met.

At step 240, the conditional handover of UE 110 may be performed. UE 110 may autonomously trigger, at step 240, the conditional handover once the condition for executing the conditional handover is fulfilled, i.e., met. Performing the conditional handover may comprise, e.g., synchronization and random access to first target cell 130a of target BS 130, if the handover is performed to first target cell 130a.

Multiple target cells, i.e., candidate cells for a handover, may be allowed for conditional handovers, e.g., in networks operating according to 3rd Generation Partnership Project, 3GPP, standards, such as LTE and NR standards. Source BS 120 may for example initialize multiple target cells for the same UE, such as UE 110. In some embodiments, initialization of various target cells may take place at different times, possibly based on different measurement reports, and source BS 120 may provide a handover command to UE 110 for each of said multiple target cells separately. On the other hand, in some embodiments, source BS 120 may initialize multiple target cells based on a single measurement and transmit multiple handover commands to UE 110 at the same time. In general, the handover command may be a Radio Resource Control, RRC, reconfiguration message.

It may happen that some, or even all, of said multiple target cells for UE 110 belong to the same target BS 130. However, existing mobility signaling over wired interface 135, such as X2 or Xn interface, does not facilitate initialization and preparation of multiple target cells towards the same target BS 130. Embodiments of the present invention thus provide improvements for preparation of multiple target cells of the same target BS 130 for a handover, such as a conditional handover.

Figure 3:
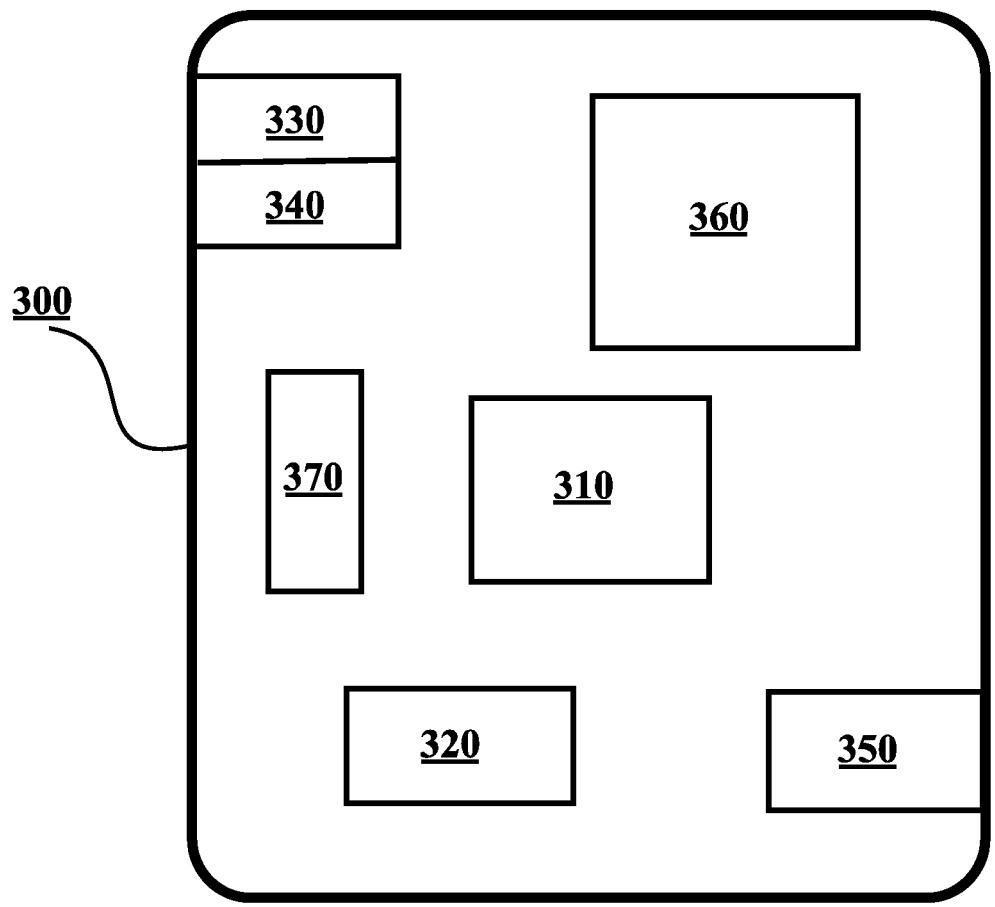
FIG. 3 illustrates an example apparatus capable of supporting at least some embodiments.

FIG. 3 illustrates an example apparatus capable of supporting at least some embodiments. Illustrated is device 300, which may comprise, for example, source BS 120 or target BS 130, or a device controlling functioning thereof. Comprised in device 300 is processor 310, which may comprise, for example, a single- or multi-core processor wherein a single-core processor comprises one processing core and a multi-core processor comprises more than one processing core. Processor 310 may comprise, in general, a control device. Processor 310 may comprise more than one processor. Processor 310 may be a control device. A processing core may comprise, for example, a Cortex-A8 processing core manufactured by ARM Holdings or a Steamroller processing core produced by Advanced Micro Devices Corporation. Processor 310 may comprise at least one Qualcomm Snapdragon and/or Intel Atom processor. Processor 310 may comprise at least one Application-Specific Integrated Circuit, ASIC. Processor 310 may comprise at least one Field-Programmable Gate Array, FPGA. Processor 310 may be means for performing method steps in device 300. Processor 310 may be configured, at least in part by computer instructions, to perform actions.

A processor may comprise circuitry, or be constituted as circuitry or circuitries, the circuitry or circuitries being configured to perform phases of methods in accordance with embodiments described herein. As used in this application, the term "circuitry" may refer to one or more or all of the following: (a) hardware-only circuit implementations, such as implementations in only analog and/or digital circuitry, and (b) combinations of hardware circuits and software, such as, as applicable: (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Device 300 may comprise memory 320. Memory 320 may comprise random-access memory and/or permanent memory. Memory 320 may comprise at least one RAM chip. Memory 320 may comprise solid-state, magnetic, optical and/or holographic memory, for example. Memory 320 may be at least in part accessible to processor 310. Memory 320 may be at least in part comprised in processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions. Memory 320 may be at least in part comprised in processor 310. Memory 320 may be at least in part external to device 300 but accessible to device 300.

Device 300 may comprise a transmitter 330. Device 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. Transmitter 330 and/or receiver 340 may be configured to operate in accordance with Global System for Mobile communication, GSM, Wideband Code Division Multiple Access, WCDMA, 5G, Long Term Evolution, LTE, IS-95, Wireless Local Area Network, WLAN, Ethernet and/or Worldwide Interoperability for Microwave Access, WiMAX, standards, for example.

Device 300 may comprise a Near-Field Communication, NFC, transceiver 350. NFC transceiver 350 may support at least one NFC technology, such as Bluetooth, Wibree or similar technologies.

Device 300 may comprise User Interface, UI, 360. UI 360 may comprise at least one of a display, a keyboard, a touchscreen, a vibrator arranged to signal to a user by causing device 300 to vibrate, a speaker and a microphone. A user may be able to operate device 300 via UI 360, for example to accept incoming telephone calls, to originate telephone calls or video calls, to browse the Internet, to manage digital files stored in memory 320 or on a cloud accessible via transmitter 330 and receiver 340, or via NFC transceiver 350, and/or to play games.

Device 300 may comprise or be arranged to accept a user identity module 370. User identity module 370 may comprise, for example, a Subscriber Identity Module, SIM, card installable in device 300. A user identity module 370 may comprise information identifying a subscription of a user of device 300. A user identity module 370 may comprise cryptographic information usable to verify the identity of a user of device 300 and/or to facilitate encryption of communicated information and billing of the user of device 300 for communication effected via device 300.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further devices not illustrated in FIG. 3. For example, where device 300 comprises a smartphone, it may comprise at least one digital camera. Some devices 300 may comprise a back-facing camera and a front-facing camera, wherein the back-facing camera may be intended for digital photography and the front-facing camera for video telephony. Device 300 may comprise a fingerprint sensor arranged to authenticate, at least in part, a user of device 300. In some embodiments, device 300 lacks at least one device described above. For example, some devices 300 may lack a NFC transceiver 350 and/or user identity module 370.

Processor 310, memory 320, transmitter 330, receiver 340, NFC transceiver 350, UI 360 and/or user identity module 370 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the embodiments.

For 5G networks, it is envisaged that the architecture may be based on a so-called CU-DU (central unit—distributed unit) split, where one gNB-CU controls several gNB-DUs.

The term 'gNB' may correspond in 5G to the eNB in LTE. The gNBs (one or more) may communicate with one or more UEs. The gNB-CU (central node) may control a plurality of spatially separated gNB-DUs, acting at least as transmit/receive (Tx/Rx) nodes. In some embodiments, however, the gNB-DUs (also called DU) may comprise e.g. a radio link control, RLC, medium access control, MAC, layer and a physical, PHY, layer, whereas the gNB-CU (also called a CU) may comprise the layers above RLC layer, such as a packet data convergence protocol, PDCP, layer, a radio resource control, RRC and an internet protocol, IP, layers. Other functional splits are possible too. It is considered that skilled person is familiar with the OSI model and the functionalities within each layer.

Some other technology advancements probably to be used are Software-Defined Networking, SDN, Big Data, and all-IP, to mention only a few non-limiting examples. For example, network slicing may be a form of virtual network architecture using the same principles behind software defined networking, SDN, and network functions virtualisation, NFV, in fixed networks. SDN and NFV may deliver greater network flexibility by allowing traditional network architectures to be partitioned into virtual elements that can be linked (also through software). Network slicing allows multiple virtual networks to be created on top of a common shared physical infrastructure. The virtual networks are then customised to meet the specific needs of applications, services, devices, customers or operators.

The plurality of gNBs (access points/nodes), each comprising the CU and one or more DUs, may be connected to each other via the Xn interface over which the gNBs may negotiate. The gNBs may also be connected over next generation (NG) interfaces to a 5G core network (5GC), which may be a 5G equivalent for the core network of LTE. Such 5G CU-DU split architecture may be implemented using cloud/server so that the CU having higher layers locates in the cloud and the DU is closer to or comprises actual radio and antenna unit. There are similar plans ongoing for LTE/LTE-A/eLTE as well. When both eLTE and 5G will use similar architecture in a same cloud hardware (HW), the next step may be to combine software (SW) so that one common SW controls both radio access networks/technologies (RAN/RAT). This may allow then new ways to control radio resources of both RANs. Furthermore, it may be possible to have configurations where the full protocol stack is controlled by the same HW and handled by the same radio unit as the CU.

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

Figure 4:
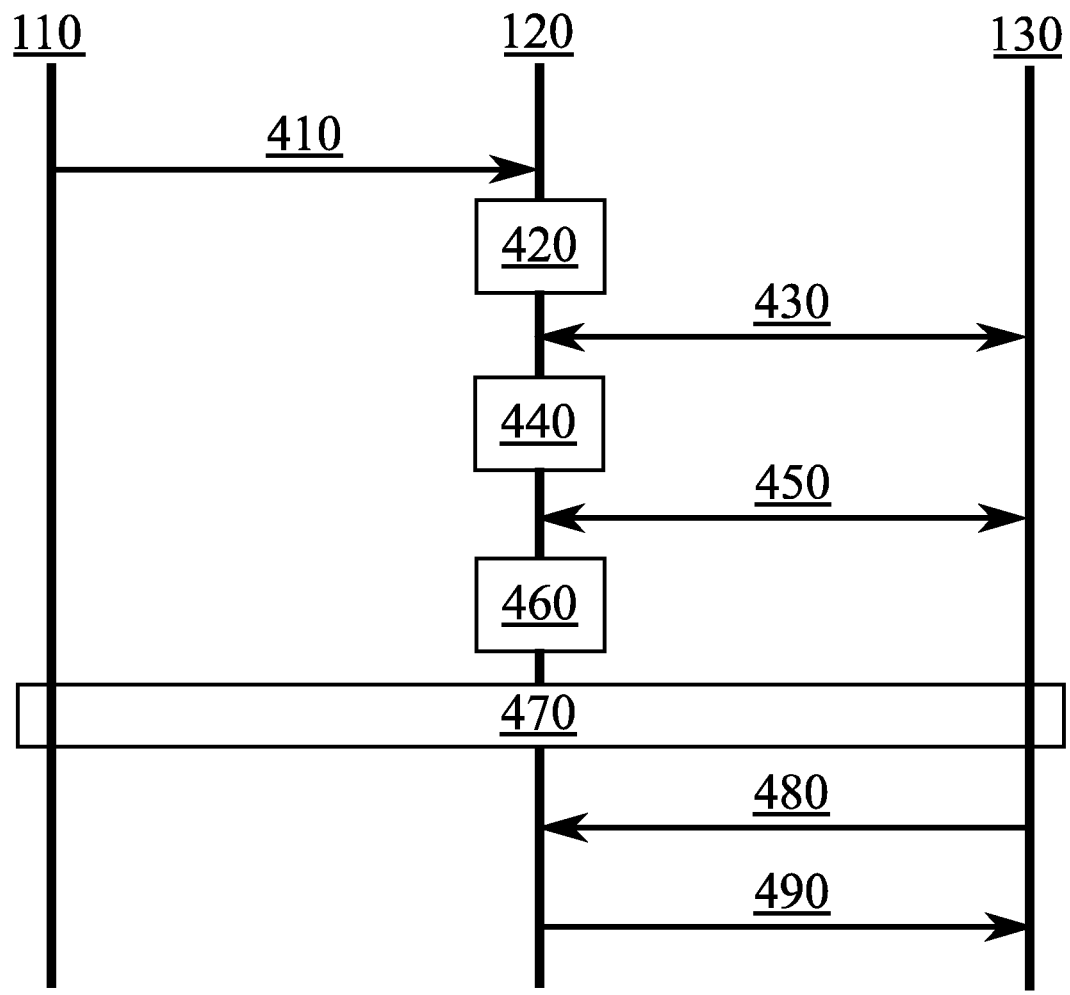
FIG. 4 illustrates a first exemplary signalling graph for a handover in accordance with at least some embodiments.

FIG. 4 illustrates a first exemplary signalling graph for a handover in accordance with at least some embodiments. On the vertical axes are disposed, from the left to the right, UE 110, source BS 120 and target BS 130 of FIG. 1. The first exemplary signaling graph of FIG. 4 demonstrates a source-based method for a handover of UE 110. The handover may be a conditional handover.

FIG. 4 demonstrates a solution, wherein source BS 120 may create multiple identifiers for handover preparation procedures, i.e., different identifiers for different handover preparation procedures, towards target cells of the same target BS 130. Target BS 130 may maintain different handover contexts of different handover preparation procedures separately without binding different handover preparation procedures or identifiers for different handover preparation procedures. Instead, different handover preparation procedures may be bound by source BS 120.

At step 410, UE 110 may transmit at least one measurement report to source BS 120. The at least one measurement report may comprise measurement results of UE 110, e.g., for cells 130a, 130b and 130c of target BS 130. One measurement report may convey measurement results of one cell, or of many cells. Upon receiving the at least one measurement report, source BS 120 may decide, at step 420, to prepare at least two target cells, such as first target cell 130a and second target cell 130b, of target BS 130 of FIG. 1 for a handover of UE 110. At step 420, source BS 120 may thus start initializing first target cell 130a of said at least two target cells of target BS 130, i.e., initialize a first handover preparation procedure, for a handover of UE 110.

Said initialization may comprise, at step 430, transmitting by source BS 120 an identifier of a first handover preparation procedure to target BS 130. For instance, source BS 120 may transmit a first handover preparation request comprising the identifier of the first handover preparation procedure to target BS 130. The identifier of the first handover preparation procedure may be for example X2-AP-UEID or XN-AP-UEID, denoted by X2-AP-UEID1 for example. In some embodiments, the first handover preparation request may also comprise an identifier of first target cell 130a, i.e., the first handover preparation request may be associated with first target cell 130a.

At step 430, target BS 130 may also transmit, in response to receiving the identifier of the first handover preparation procedure, i.e., the first handover preparation request, an acknowledgment associated with the first handover preparation request. The acknowledgment associated with the first handover preparation request may comprise the identifier of the first handover preparation procedure. The acknowledgement associated with the first handover preparation request may indicate that target BS 130 has accepted the first handover preparation request and started preparation of, or prepared, first target cell 130a for a handover of UE 110. Upon transmitting the acknowledgement associated with the first handover preparation request, target BS 130 may provide target cell 130a for the handover of UE 110.

In some embodiments, target BS 130 may transmit to source BS 120 a first forwarding tunneling information associated with the first handover preparation procedure at step 430. The first forwarding tunneling information associated with the first handover preparation procedure may comprise an identifier of a tunnel that is to be used by source BS 120 for transmitting data of UE 110, if the handover is performed to first target cell 130a.

At step 440, source BS 120 may create a binding between UE 110, e.g., a context of UE 110, and the identifier of the first handover preparation procedure. That is to say, source BS 120 may create a binding between the first handover preparation procedure and UE 110, i.e., binding may be between first target cell 130a and UE 110. Source BS 120 may bind the identifier of the first handover preparation procedure with UE 110. Said binding may comprise associating the identifier of the first handover preparation procedure with UE 110.

In addition, source BS 120 may start initializing second target cell 130b of said at least two target cells of target BS 130, i.e., initialize a second handover preparation procedure, for a handover of UE 110 at step 440. Said initialization may comprise, at step 450, transmitting by source BS 120 a second handover preparation request comprising an identifier of the second handover preparation procedure to target BS 130. For instance, source BS 120 may transmit a second handover preparation request comprising the identifier of the second handover preparation procedure. The identifier of the second handover preparation procedure may be for example X2-AP-UE-ID or XN-AP-UE-ID, denoted by X2-AP-UEID2 for example. In some embodiments, the second handover preparation request may also comprise an identifier of second target cell 130*b*, i.e., the second handover preparation request may be associated with second target cell 130*b*.

Source BS 120 may set the identifier of the second handover preparation procedure different as the identifier of the first handover preparation procedure. In other words, the identifier of the first handover preparation procedure may be different compared to the identifier of the second handover preparation procedure.

At step 450, target BS 130 may also transmit, in response to receiving the identifier of the second handover preparation procedure, i.e., the second handover preparation request, an acknowledgment associated with the second handover preparation request. The acknowledgment associated with the second handover preparation request may comprise the identifier of the second handover preparation request. The acknowledgement associated with the second handover preparation request may indicate that target BS 130 has accepted the second handover preparation request and started preparation of, or prepared, second target cell 130*b* for the handover of UE 110. Upon transmitting the acknowledgement associated with the second handover preparation request, target BS 130 may provide second target cell 130*b* for the handover of UE 110.

In some embodiments, target BS 130 may transmit to source BS 120 a second forwarding tunneling information associated with the second handover preparation procedure at step 450. The second forwarding tunneling information associated with the second handover preparation procedure may comprise an identifier of a tunnel that is to be used by source BS 120 for transmitting data of UE 110, if the handover is performed to second target cell 130*b*. The tunnel that is to be used by source BS 120 for transmitting data of UE 110 if the handover is performed to second target cell 130*b* may be different than the tunnel that is to be used by source BS 120 for transmitting data of UE 110 if the handover is performed to first target cell 130*a*.

In some embodiments, the first and the second forwarding tunneling information may define a first and a second data forwarding tunnels, respectively. For a given UE such as UE 110, if the first and the second data forwarding tunnels are provided for the first and the second handover preparation procedures, respectively, source BS 120 may select only one the first and the second data forwarding tunnels for forwarding of data of UE 110 during preparation of a handover. For instance, source BS 120 may start forwarding of data of UE 110 over the first data forwarding tunnel and possibly perform the selection later on.

At step 460, source BS 120 may bind the identifier of the first handover preparation procedure and the identifier of the second handover preparation procedure. Said binding may comprise associating the first identifier of the first handover preparation procedure and the identifier of the second handover preparation procedure with UE 110, i.e., with the context of UE 110. For instance, the identifier of the first handover preparation procedure and the identifier of first target cell 130*a* may be bind with the identifier of the second handover preparation procedure and the identifier of second target cell 130*b* and UE 110, i.e., UE-ID→(first target cell 130*a*, X2-AP-UEID1), (second target cell 130*b*, X2-AP-UEID2). That is to say, an identity and/or context of UE 110 may be associated with the identifiers of the first and the second handover preparation procedures.

For instance, source BS 120 may combine based on the binding, a first handover preparation response associated with the first handover preparation procedure and a second handover preparation response associated with the second handover preparation procedure. The first handover preparation response and the second handover preparation response may be transmitted by target BS 130 to source BS 120 in a single response message or in separate response messages. Source BS 120 may combine based on the binding the first handover preparation response and the second handover preparation response for the two different identifiers of the first and the second handover preparation procedures.

Source BS 120 may further maintain the binding between the two ongoing handover preparation procedures, i.e., the first and the second handover preparation procedures, for same UE 110. That is to say, source BS 120 may maintain the binding between multiple handover preparation via independent procedures.

At step 470, handover of UE 110 from a cell of source BS 120 to first target cell 130*a* of target BS 130 may be performed successfully, e.g., similarly as at step 240 of FIG. 2. Upon successful handover, target BS 130 may transmit, at step 480, a release message indicating release of the context of UE 110. The release message indicating release of the context of UE 110 may be associated with first target cell 130*a* of target BS 130, if the handover was performed successfully to first target cell 130*a* of target BS 130. That is to say, the release message may comprise an identifier of first target cell 130*a* of target BS 130.

In response to receiving the release message, source BS 120 may decide to release other prepared resource in other target cells, such as second target cell 130*b* of target BS 130. For instance, source BS 120 may, at step 490, transmit to target BS 130 a handover cancellation message associated with second target cell 130*b* of target BS 130. The handover cancellation message may thus comprise the identifier of the second handover preparation procedure. Target BS 130 may cancel the second handover preparation procedure in response to receiving the handover cancellation message.

In some embodiments, source BS 120 may, in response to receiving the release message, determine based on the binding that first target cell 130*a* and second target cell 130*b* belong to target BS 130, i.e., to the same target base station. Consequently, source BS 120 may select a tunnel for forwarding data of UE 110 and transmit said data of UE 110 via the selected tunnel. For instance, if handover is performed to first target cell 130*a*, source BS 120 may select and use the first forwarding tunneling information associated with the first handover preparation procedure. That is to say, source BS 120 may select one of the first and the second forwarding tunneling information and transmit, to target BS 130, data associated with UE 110 using the selected forwarding tunneling information, i.e., a selected data forwarding tunnel, during preparation of a handover, during the handover and after the handover. The selected data forwarding tunnel may be changeable as well.

In some embodiments, source BS 120 may freely decide which tunnel to use. Source BS 120 may decide to use only one tunnel, more than one tunnel or all tunnels. However, once the handover is performed and UE 110 is connected to target BS 130, source BS 120 may perform remapping between a request for which the forwarding took place and the one that was executed. In any case, data forwarding may start after receiving, by source BS 120, an acknowledgement associated with a first handover procedure from target BS 130.

In some embodiments, target BS 130 may buffer data of UE 110 that has been forwarded to target BS 130 by source BS 120. For instance, target BS 130 may buffer data that has been forwarded for different handover preparation procedures, such as X2/XN UE contexts, separately until completion of the handover. That is to say, target BS 130 may buffer data that has been forwarded for different handover preparation procedures in different buffers. Said different buffers may be distinguished based on an assigned identity of UE 110, such as a Cell Radio Network Temporary Identifier, C-RNTI. The assigned identity of UE 110 may be received in a contention resolution identifier, included for example in a handover complete message. Thus, there may be loss of forwarded data if UE 110 completes the handover towards a non-primary target cell, i.e., a different target cell than a primary target cell, because data of UE 110 may have been forwarded to the primary target cell.

To avoid loss of forwarded data, source BS 120 may indicate the primary target cell, such as first target cell 130*a*, to UE 110. That is to say, source BS 120 may select the primary target cell for the handover and transmit an identifier of the primary target cell to UE 110. The primary target cell may be the one towards which source BS 120 starts forwarding data of user 110. In some embodiments, source BS 120 may transmit a Radio Resource Control, RRC, message to UE 110, the RRC message comprising the identifier of the primary target cell. The RRC message may be a RRC reconfiguration message for a conditional handover.

Upon completing the handover, UE 110 may transmit a handover complete message indicating a successful handover to target BS 130. In some embodiments, the handover complete message may comprise the identifier of the primary target cell, i.e., primary cell-ID, for instance if the handover is completed towards a non-primary target cell, such as second target cell 130*b*.

Thus, target BS 130 may receive the identifier of the primary target cell and use the identifier of the primary target cell to identify at least one buffer, the at least one buffer comprising data of user 110. The data of user 110 may be transmitted to user 110 after Packet Data Convergence Protocol, PDCP, re-establishment, at the non-primary target cell.

Figure 5:
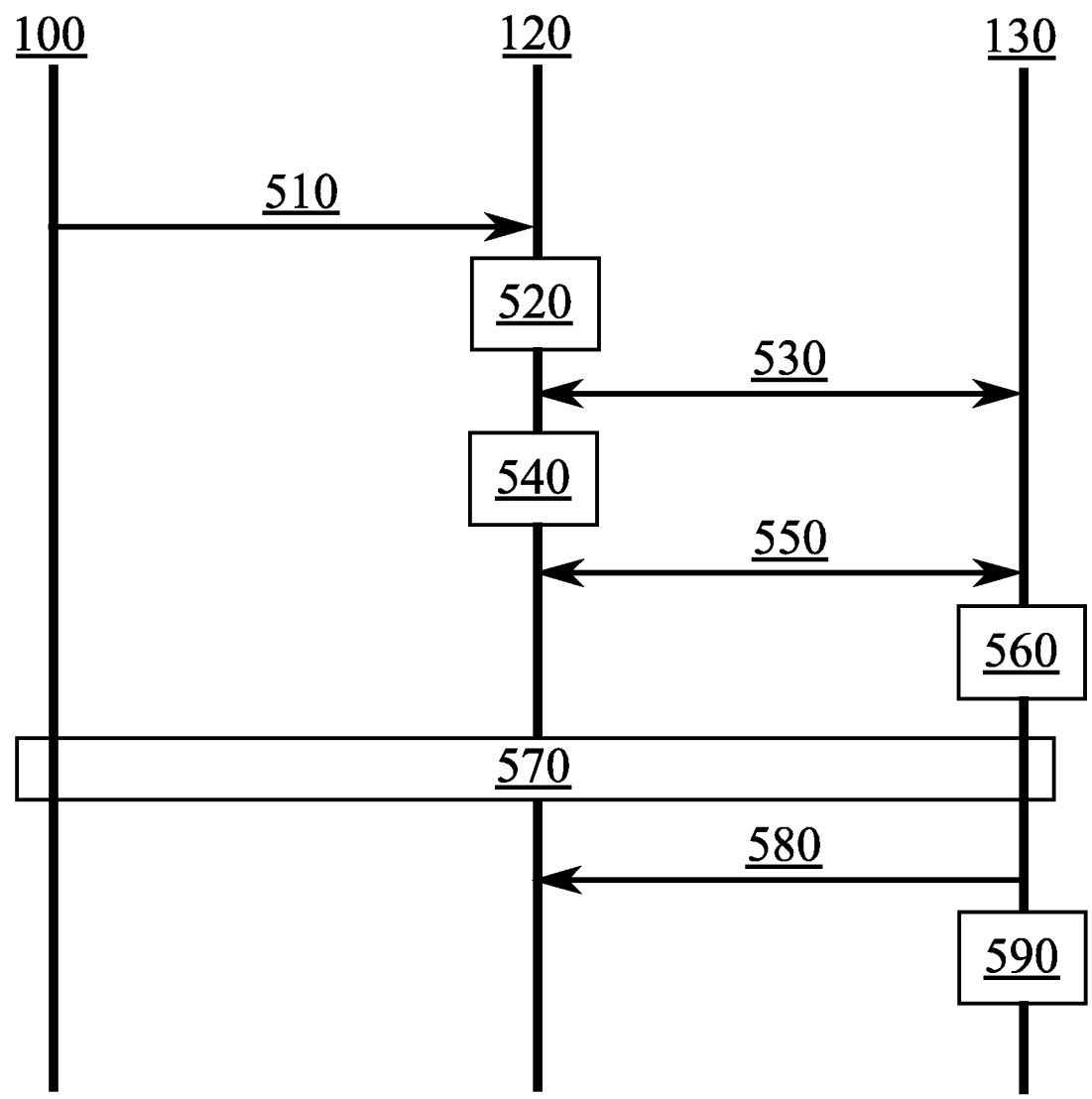
FIG. 5 illustrates a second exemplary signalling graph for a handover in accordance with at least some embodiments.

FIG. 5 illustrates a second exemplary signalling graph for a handover in accordance with at least some embodiments. On the vertical axes are disposed, from the left to the right, UE 110, source BS 120 and target BS 130 of FIG. 1. The second exemplary signaling graph of FIG. 5 demonstrates a target-based method for a handover of UE 110. The handover may be a conditional handover.

FIG. 5 demonstrates a solution, wherein target BS 130 may maintain information for multiple handover preparation procedures, even though the same identifier may be used for different handover preparation procedures. Different handover preparation procedures may be identified by target BS 130 based on different identifiers of target cells, included for example in handover preparation requests of the handover preparation procedures.

Steps 510-530 in FIG. 5 may correspond to steps 410-430 of FIG. 4, respectively. So at step 510, UE 110 may transmit at least one measurement report to source BS 120 and upon receiving the at least one measurement report, source BS 120 may decide, at step 520, to prepare at least two target cells, such as first target cell 130*a* and second target cell 130*b*, of target BS 130 of FIG. 1 for a handover of UE 110. At step 530, source BS 120 may start initializing first target cell 130*a* of said at least two target cells of target BS 130, i.e., initialize a first handover preparation procedure, for a handover of UE 110.

Said initialization may comprise, at step 530, transmitting by source BS 120 an identifier of the first handover preparation procedure to target BS 130. At step 530, target BS 130 may also transmit, in response to receiving the identifier of the first handover preparation procedure, i.e., the first handover preparation request, an acknowledgment associated with the first handover preparation request, to indicate that target BS 130 has accepted the first handover preparation request and started preparation of first target cell 130*a* for a handover of UE 110. The first handover preparation request may also comprise an identifier of first target cell 130*a*, i.e., the first handover preparation request may be associated with first target cell 130*a*. In some embodiments, target BS 130 may transmit to source BS 120 a first forwarding tunneling information associated with the first handover preparation procedure at step 430.

At step 540, source BS 120 may create a binding between UE 110, e.g., a context of UE 110, the identifier of the first handover preparation procedure and the identifier of first target cell 130*a* similarly as at step 440 of FIG. 4. Source BS 120 may start, at step 540, initialization of second target cell 130*b* of said at least two target cells of target BS 130, i.e., a second handover preparation procedure, for a handover of UE 110. However, at step 540 source BS 120 may set the identifier of the second handover preparation procedure same as the identifier of the first handover preparation procedure. Said initialization of the second handover preparation procedure may comprise at step 550 transmitting, by source BS 120, a second handover preparation request comprising an identifier of the second handover preparation procedure to target BS 130.

In addition, the second handover preparation request may comprise the identifier of second target cell 120 as well. Thus, target BS 130 may identify based on the identifier of second target cell 120 that the second handover preparation request is associated with second target cell 120, even though the identifier of the second handover preparation procedure is same as the identifier of the first handover preparation procedure.

Upon receiving the second handover preparation request, target BS 130 may compare the identifier of the first handover preparation procedure of UE 110 associated with first target cell 130*a* of target BS 130 and the identifier of the second handover preparation procedure of UE 110 associated with second target cell 130*b* of target BS 130. If target BS 130 determines based on the comparison that the identifier of the first handover preparation procedure and the identifier of the second handover preparation procedure are the same, target BS 130 may bind the identifier of the first handover preparation procedure and the identifier of the second handover preparation procedure and perform handover preparations for second target cell 130*b* as well, i.e., target BS 130 may perform handover preparations for both, first target cell 130*a* and second target cell 130*b*.

In some embodiments, target BS 130 may decide to reject the second handover preparation request though. In such a case, target BS 130 may transmit a rejection message to source BS 120, the rejection message comprising the identifier of the first handover preparation procedure and the identifier of second target cell 130b. Thus, source BS 120 may identify based on the identifier of second target cell 130b that the rejection message is associated with second target cell 130b.

In some embodiments, target BS 130 may decide to accept the second handover preparation request. If so, target BS 130 may transmit, at step 550, an acknowledgment message to source BS 120, the acknowledgement message being associated with the second handover preparation request. The acknowledgment message associated with the second handover preparation request may comprise the identifier of the second handover preparation procedure. In addition, the acknowledgement message may comprise the identifier of second target cell 130b. Target BS 130 may also transmit, at step 550, an indication to source BS 120, the indication indicating that the first forwarding tunneling information is to be used for the second handover preparation procedure as well.

The acknowledgement associated with the second handover preparation request may indicate that target BS 130 has accepted the second handover preparation request and started initialization of second target cell 130b for a handover of UE 110. Upon transmitting the acknowledgement associated with the second handover preparation request, target BS 130 may provide second target cell 130b for the handover of UE 110.

At step 560, target BS 130 may bind the identifier of the first handover preparation procedure and the identifier of the second handover preparation procedure. Said binding may comprise associating the first identifier of the first handover preparation procedure and the identifier of first target cell 130a and the identifier of second target cell 130b, with UE 110. For instance, the identifier of the first handover preparation procedure and the identifier of first target cell 130a may be bind with the identifier of the first handover preparation procedure and the identifier of second target cell 130b and UE 110, i.e., UE-ID 4 (first target cell 130a, X2-AP-UEID1), (second target cell 130b, X2-AP-UEID1). That is to say, an identity and/or a context of UE 110 may be associated with the identifiers of the first and the second handover preparation procedures. Target BS 130 may further maintain the binding between the two ongoing handover preparation procedures, i.e., the first and the second handover preparation procedures, for same UE 110. That is to say, target BS 130 may maintain the binding between multiple handover preparation information received from target BS 130 via independent procedures.

Steps 570 and 580 in FIG. 5 may correspond to steps 470 and 480 in FIG. 4. So at step 570, handover of UE 110 from a cell of source BS 120 to first target cell 130a of target BS 130 may be performed successfully. Upon successful handover, target BS 130 may transmit, at step 480, a release message indicating release of the context of UE 110. The release message indicating release of the context of UE 110 may be associated with first target cell 130a of target BS 130, if the handover was performed successfully to first target cell 130a of target BS 130.

Upon transmitting the release message, target BS 130 may locally, i.e., without any indication from source BS 120, release prepared resources for the handover in other target cells, such as resources reserved at second target cell 130b.

In some embodiments, a single handover preparation request may be transmitted from source BS 120 to target BS 130 for multiple target cells. For instance, if the measurement report which triggers the handover already comprises more than one target cell and if source BS 120 decides to prepare all the target cells, source BS 120 may indicate additional target cells in the single handover preparation request, together with additional information associated with said additional target cells. For instance, source BS 120 may transmit to target BS 130 the identifier of the first handover preparation procedure and the identifier of the second handover preparation procedure in a single handover request message.

In response, target BS 130 may respond with multiple acknowledgements and/or rejections in a single message or target BS 130 may transmit an acknowledgement or a rejection separately for each of the target cells. Remaining steps of the target-based method may be the same for managing multiple handover preparations associated with the handover. That is to say, target BS 130 may transmit to source BS 120 an acknowledgement associated with the identifier of the first handover preparation procedure in a first response message and an acknowledgement associated with the identifier of the second handover preparation procedure in a second response message independently, i.e., separately. In general, a response message may comprise at least one of an acknowledgement message and a rejection message.

In some embodiments, target BS 130 may indicate to potential source BSs, such as source BS 120, an acceptable level of allocation, i.e., level of over-allocation, for initialization and preparation of multiple target cells of target BS 130. That is to say, target BS 130 may transmit an indication of an acceptable level of allocation associated with the handover of UE 110. The acceptable level of allocation associated with the handover of UE 110 may have various forms and the acceptable level may be changeable over time. The acceptable level of allocation may be referred to as an acceptance level of target BS 130, as the acceptable level of allocation may indicate whether target BS 130 is willing to prepare more target cells of target BS 130 for a handover of UE 110.

For instance, the indication of the acceptable level of allocation associated with the handover of UE 110 may comprise a maximum number of target cells of target BS 130 per UE. Thus, in some embodiments, the indication of the acceptable level of allocation associated with the handover of UE 110 may comprise a maximum number of target cells of target BS 130 for UE 110, i.e., the indication may indicate an upper limit of target cells of target BS 130 that may, or will, be prepared for the handover of UE 110.

Alternatively, or in addition, the indication of the acceptable level of allocation associated with the handover of UE 110 may comprise a maximum number of target BSs, i.e., an upper limit of a number of target BSs for the handover of UE 110. For instance, an upper limit of 1 may indicate that target BS 130 only supports a handover if target BS 130 is the only target BS. Then, an upper limit of 2 may indicate that target BS 130 only supports a handover if source BS 120 has prepared no more than 2 target BSs, i.e., one other target BS in addition to target BS 130. Alternatively, or in addition, the indication of the acceptable level of allocation associated with the handover of UE 110 may comprise an indication that no more handover preparation requests will be accepted for UE 110.

In some embodiments, the indication of the acceptable level of allocation associated with the handover of UE 110 may be a response-based explicit indication. For example, target BS 130 may transmit the indication of the acceptable level of allocation when target BS 130 responds to a handover preparation request associated with UE 110 by transmitting an acknowledgement or a rejection message.

That is to say, an acknowledgement or a rejection message may comprise the indication of the acceptable level of allocation associated with the handover of UE 110. Target BS 130 may, e.g., accept a first handover request for UE 110 but then include an indication to an acknowledgement message, the indication indicating that no further handover requests will be accepted for the same UE 110. The indication indicating that no further handover requests will be accepted for the same UE 110 may also be incorporated in a response to a subsequent handover request, if for example load of target BS 130 has increased after previously accepted handover requests. Therefore, differentiation of UEs is enabled, because for example more handover requests may be allowed for UEs with higher Quality of Service, QoS, profile. Also, dynamic changes are enabled, thereby enabling setting a limit depending on the load level.

In some embodiments, configuration-based indication may be used, i.e., configuration information or a configuration message may comprise the indication of the acceptable level of allocation associated with the handover of UE 110. For instance, target BS 130 may transmit configuration information or the configuration message to its neighbors, such as source BS 120, during a setup of wired interface 135, such as a X2 or Xn setup, to inform the neighbors about the limit of handover requests for example. The indication of the acceptable level of allocation associated with the handover of UE 110 may then be updated in a configuration update procedure. So, in some embodiments, configuration information or the configuration message may be transmitted during a configuration update. Therefore, typical way of exchanging BS configurations may be followed, e.g., if the acceptable level of allocation associated with the handover of UE 110 is more related to capabilities of target BS 130 instead of the load of target BS 130.

In case of conditional handovers potential target BSs and target cells may be dimensioned to process much more handover requests and to store much more contexts of UEs than in case of legacy handovers. For instance, if the neighbors of target BS 130 initialize and prepare 2 target cells for every handover, it would double the number of handover requests and contexts of UEs to be handled. Therefore, use of the acceptable level of allocation associated with the handover makes it possible for a vendor or an operator of target BS 130 to dimension handling to, e.g., 2 target cells per handover, because target BS 130 may force the neighbors to behave accordingly, i.e., not to exceed the dimensioning by preparing 3 or more target cells for every handover that target BS 130 is involved in.

In some embodiments, the rejection message may comprise the indication that no more handover preparation requests will be accepted for UE 110. For instance, target BS 130 may transmit the rejection message, possibly with a new Cause value, such as "maximum number of handover requests has been reached" or a dedicated flag, if target BS 130 cannot or does not want to handle any additional handover requests for UE 110. The maximum number of requests that a target cell or target BS 130 can handle may be left for network implementation or depend on a configuration of a network, via Operation, Administration, and Management, OAM, for instance. If the Cause value is reused for transmitting the indication that no more handover preparation requests will be accepted for UE 110, the process is very light. Moreover, differentiation of UEs may be allowed, because for example more handover requests may be allowed for UEs with higher Quality of Service, QoS, profile.

The response-based explicit indication and configuration-based indication may be used together. Moreover, the maximum number of target cells for UE 110, the maximum number of target base stations, such as target BS 130, and the indication that no more handover preparation requests will be accepted for UE 110 are not mutually exclusive and may be used together as well. For instance, configuration-based information may be used to indicate an upper limit for all UEs, while either of the response-based methods may be employed to differentiate the limit per UE or UE class, if needed.

Some embodiments of the present invention thus make it possible for target BS 130 to dimension handling of handover requests, i.e., target BS 130 may dimension handling of handover requests to also support neighbors that would like to prepare an unreasonable number of target cells for a handover of UE 110. For instance, source BS 130 may want to prepare much more than 5 target cells of target BS 130 for the handover of UE 110, but target BS 130 may consider that only 1 or 2 target cells of target BS 130 would be reasonable. Hence target BS 130 may ensure that source BS 120 does not initialize preparation of more than 2 target cells of target BS 130 by limiting behaviour of source BS 120. In addition, there may be some additional issues related to handling of handover requests and contexts of UEs, but the indication of an acceptable level of allocation associated with a handover of UE 110 enables a simple implementation and forcing the neighbors to comply with the dimensioning of target BS 130.

The indication of the acceptable level of allocation associated with the handover of UE 110 may be exploited in case of both, the source-based and the target-based, methods. However, the indication of the acceptable level of allocation associated with the handover of UE 110 may be particularly useful in case of the target-based method, because that method allows target BS 130 to recognize that there are multiple requests for the same UE 110. In case of the source-based method, source BS 120 hides the fact that there are multiple handover preparation requests for the same UE 110 by using different identifiers for different handover preparation procedures of UE 110. The maximum number of target cells for UE 110 and the maximum number of target base stations may be still useful indications in case of the source-based method, even if target BS 130 cannot verify that source BS 120 behaves correctly.

Figure 6:
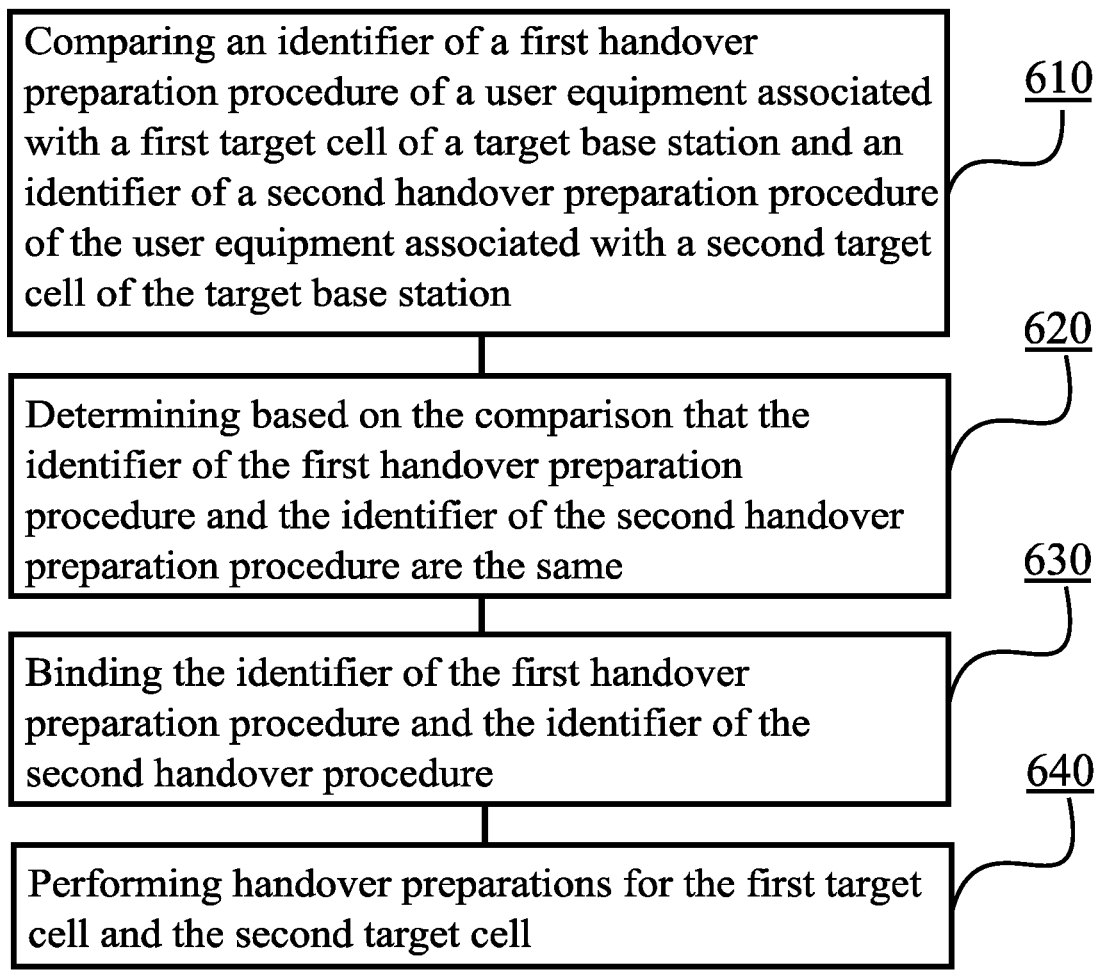
FIG. 6 illustrates a flow graph of a first method in accordance with at least some embodiments.

FIG. 6 is a flow graph of a first method in accordance with at least some embodiments. The phases of the illustrated first method may be performed by target BS 130 by a control device configured to control the functioning thereof, possibly when installed therein. The phases of the first method may be suitable for a conditional handover. The first method may correspond to the target-based method of FIG. 5.

The first method may comprise, at step 610, comparing an identifier of a first handover preparation procedure of a user equipment associated with a first target cell of the target base station and an identifier of a second handover preparation procedure of the user equipment associated with a second target cell of the target base station. The first method may also comprise, at step 620, determining based on the comparison that the identifier of the first handover preparation procedure and the identifier of the second handover preparation procedure are the same. Moreover, the first method may comprise, at step 630, binding the identifier of the first handover preparation procedure and the identifier of the second handover preparation procedure. Finally, the first method may comprise, at step 640, performing handover preparations for the first target cell and the second target cell.

Figure 7:
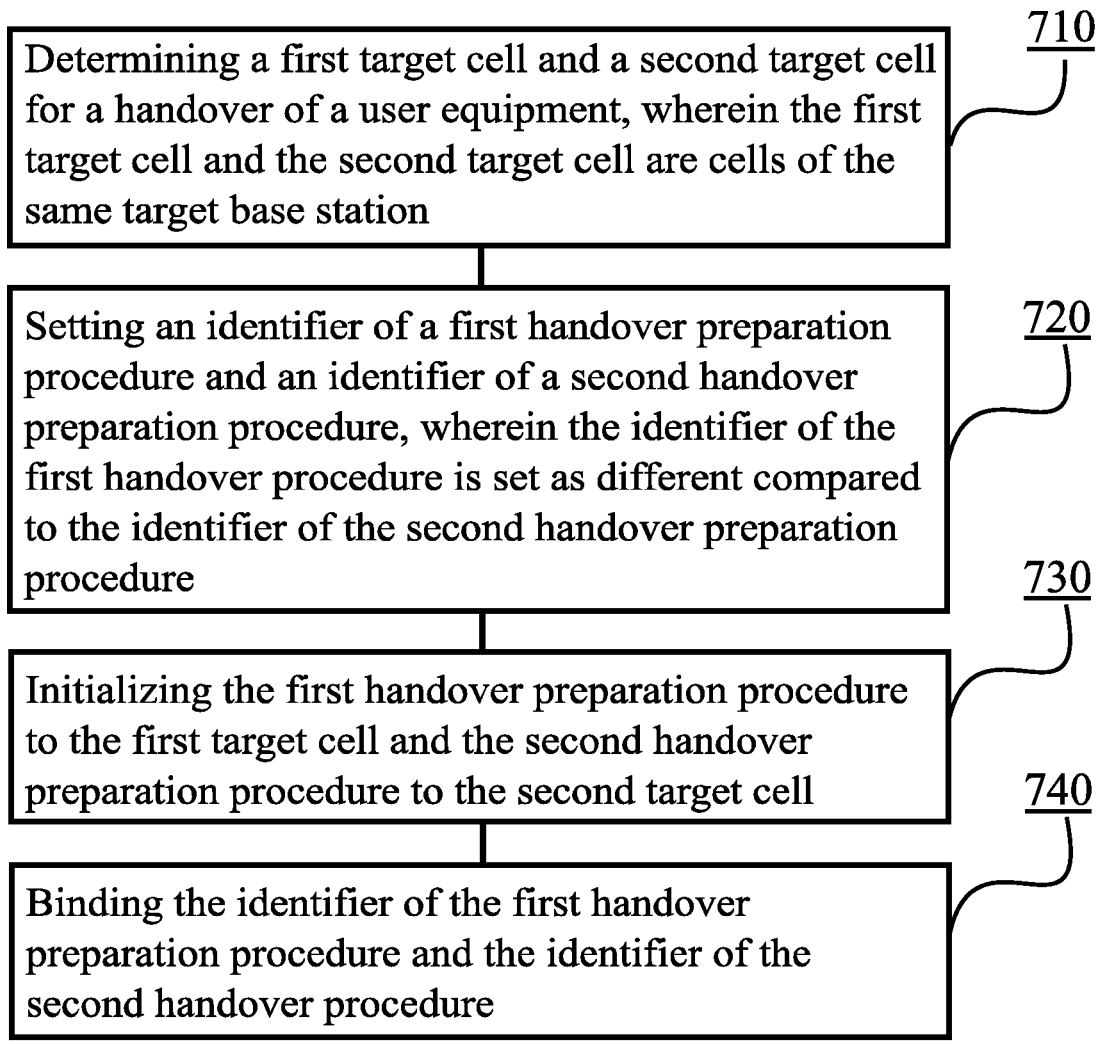
FIG. 7 illustrates a flow graph of a second method in accordance with at least some embodiments.

FIG. 7 is a flow graph of a second method in accordance with at least some embodiments. The phases of the illustrated second method may be performed by source BS 120, or by a control device configured to control the functioning thereof, possibly when installed therein. The phases of the second method may be suitable for a conditional handover. The second method may correspond to the source-based method of FIG. 4.

The second method may comprise, at step 710, determining a first target cell and a second target cell for a handover of a user equipment, wherein the first target cell and the second target cell are cells of the same target base station. The second method may also comprise, at step 720, setting an identifier of a first handover preparation procedure and an identifier of a second handover preparation procedure, wherein the identifier of the first handover preparation procedure is set as different compared to the identifier of the second handover preparation procedure. Moreover, the second method may comprise, at step 730, initializing the first handover preparation procedure to the first target cell and the second handover preparation procedure to the second target cell. Finally, the second method may comprise, at step 740, binding the identifier of the first handover preparation procedure and the identifier of the second handover preparation procedure.

It is to be understood that the embodiments disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and examples may be referred to herein along with alternatives for the various components thereof. It is understood that such embodiments, examples, and alternatives are not to be construed as de facto equivalents of one another, but are to be considered as separate and autonomous representations.

In an exemplary embodiment, an apparatus, such as, for example, source BS 120 or target BS 130, or a control device configured to control the functioning thereof, may comprise means for carrying out the embodiments described above and any combination thereof.

In an exemplary embodiment, a computer program may be configured to cause a method in accordance with the embodiments described above and any combination thereof. In an exemplary embodiment, a computer program product, embodied on a non-transitory computer readable medium, may be configured to control a processor to perform a process comprising the embodiments described above and any combination thereof.

In an exemplary embodiment, an apparatus, such as, for example source BS 120 or target BS 130, or a control device configured to control the functioning thereof, may comprise at least one processor, and at least one memory including computer program code, wherein the at least one memory and the computer program code are configured to, with the at least one processor, cause the apparatus at least to perform the embodiments described above and any combination thereof.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the embodiments in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

ACRONYMS LIST

3GPP $3^{rd}$ Generation Partnership Project
ASIC Application-Specific Integrated Circuit
BS Base Station
C-RNTI Cell Radio Network Temporary Identifier
FPGA Field-Programmable Gate Array
GSM Global System for Mobile communication
IoT Internet of Things
IP Internet Protocol
LTE Long-Term Evolution
M2M Machine-to-Machine
MAC Media Access Control
NFC Near-Field Communication
NFV Network Functions Virtualisation
NR New Radio
OAM Operation, Administration, and Management
PDCP Packet Data Convergence Protocol
PHY Physical
QoS Quality of Service
RAN Radio Access Network
RAT Radio Access Technology
RLC Radio Link Control
RRC Radio Resource Control
SDN Software Defined Networking SIM Subscriber Identity Module
UE User Equipment
UI User Interface
WCDMA Wideband Code Division Multiple Access
WLAN Wireless Local Area Network
WiMAX Worldwide Interoperability for Microwave Access

The invention claimed is:

1. An apparatus comprising at least one processing core, at least one memory including computer program code, the at least one memory and the computer program code being configured to, with the at least one processing core, cause the apparatus at least to: receive a first handover preparation request from the source base station, wherein the first handover preparation request is associated with the user equipment and comprises an identifier of a first handover preparation procedure and an identifier of a first target cell of the target base station; and receive a second handover preparation request from the source base station, wherein the second handover preparation request is associated with the user equipment and comprises an identifier of a second handover preparation procedure and an identifier of a second target cell of the target base station; and transmit, from the target base station to the source base station, an indication of a maximum level of allocation associated with a handover of a user equipment, wherein the indication comprises at least one of: a maximum number of prepared target cells for the user equipment, a maximum number of target base stations for the user equipment and an indication that no more handover preparation requests are allowed for the user equipment, wherein the handover of the user equipment is a conditional handover.

2. The apparatus according to claim 1, wherein the at least one memory and the computer program code are further configured to, with the at least one processing core, cause the apparatus at least to:

transmit the indication of the maximum level of allocation associated with the handover of the user equipment in a configuration message.

3. The apparatus according to claim 1, wherein the at least one memory and the computer program code are further configured to, with the at least one processing core, cause the apparatus at least to:

compare the identifier of the first handover preparation procedure associated with the first target cell of the target base station and the identifier of the second handover preparation procedure associated with the second target cell of the target base station;

determine based on the comparison that the identifier of the first handover preparation procedure and the identifier of the second handover preparation procedure are the same;

bind the identifier of the first handover preparation procedure and the identifier of the second handover preparation procedure; and perform handover preparations for the first target cell and the second target cell.

4. The apparatus according to claim 3, wherein said binding comprises associating the identifier of the first handover preparation procedure and the identifier of the second handover preparation procedure with the user equipment.

5. The apparatus according to claim 3, wherein the at least one memory and the computer program code are further configured to, with the at least one processing core, cause the apparatus at least to:

decide to reject the second handover preparation request; and transmit a rejection message to the source base station, the rejection message comprising the identifier of the first handover preparation procedure and the identifier of the second target cell.

6. The apparatus according to claim 1, wherein the at least one memory and the computer program code are further configured to, with the at least one processing core, cause the apparatus at least to:

decide to accept the second handover preparation request; and transmit an acknowledgement message to the source base station, the acknowledgement message comprising the identifier of the first handover preparation procedure and the identifier of the second target cell.

7. The apparatus according to claim 1, wherein the identifier of the first handover preparation procedure is a X2-AP-UE-ID or XN-AP-UE-ID.

8. The apparatus according to claim 1, wherein the at least one memory and the computer program code are further configured to, with the at least one processing core, cause the apparatus at least to:

transmit, to the source base station, a first forwarding tunneling information associated with the first handover preparation procedure; and transmit to the source base station an indication indicating that the first forwarding tunneling information is to be used for the second handover preparation procedure upon determining that the identifier of the first handover preparation procedure and the identifier of the second handover preparation procedure are the same.

9. The apparatus according to claim 1, wherein the handover of the user equipment is a conditional handover.

10. An apparatus comprising at least one processing core, at least one memory including computer program code, the at least one memory and the computer program code being configured to, with the at least one processing core, cause the apparatus at least to: transmit a first handover preparation request to the target base station, wherein the first handover preparation request is associated with the user equipment and comprises an identifier of a first handover preparation procedure and an identifier of a first target cell of the target base station; and transmit a second handover preparation request to the target base station, wherein the second handover preparation request is associated with the user equipment and comprises an identifier of a second handover preparation procedure and an identifier of a second target cell of the target base station; and receive, from a target base station, an indication of a maximum level of allocation associated with a handover of a user equipment, wherein the indication of the maximum level of allocation associated with the handover of the user equipment comprises at least one of: a maximum number of prepared target cells for the user equipment, a maximum number of target base stations for the user equipment and an indication that no more handover preparation requests are allowed for the user equipment, wherein the handover of the user equipment is a conditional handover;

decide, whether to trigger a handover preparation procedure for the user equipment based on the received indication.

11. The apparatus according to claim 10, wherein the at least one memory and the computer program code are further configured to, with the at least one processing core, cause the apparatus at least to:

receive the indication of the maximum level of allocation associated with the handover of the user equipment in a configuration message.

12. The apparatus according to claim 10, wherein the at least one memory and the computer program code are further configured to, with the at least one processing core, cause the apparatus at least to:
receive a rejection message from the target base station, the rejection message indicating rejection of the second handover preparation request and comprising the identifier of the first handover preparation procedure and the identifier of the second target cell.

13. The apparatus according to claim 10, wherein the at least one memory and the computer program code are further configured to, with the at least one processing core, cause the apparatus at least to:
receive an acknowledgement message from the target base station, the acknowledgement message indicating acknowledgement of the second handover preparation request and comprising the identifier of the first handover preparation procedure and the identifier of the second target cell.

14. The apparatus according to claim 10, wherein the identifier of the first handover preparation procedure is a X2-AP-UE-ID or XN-AP-UE-ID.

15. The apparatus according to claim 10, wherein the at least one memory and the computer program code are further configured to, with the at least one processing core, cause the apparatus at least to:
receive, from the target base station, a first forwarding tunneling information associated with the first handover preparation procedure; and
receive from the target base station an indication indicating that the first forwarding tunneling information is to be used for the second handover preparation procedure when the identifier of the first handover preparation procedure and the identifier of the second handover preparation procedure are the same.

16. The apparatus according to claim 10, wherein the handover of the user equipment is a conditional handover.

17. An apparatus comprising at least one processing core, at least one memory including computer program code, the at least one memory and the computer program code being configured to, with the at least one processing core, cause the apparatus at least to:
receive, at a target base station, a first handover preparation request from a source base station, wherein the first handover preparation request is associated with a user equipment and comprises an identifier of a first handover preparation and a cell identifier of a first target cell of the target base station;
receive, at the target base station, a second handover preparation request from the source base station, wherein the second handover preparation request is associated with the user equipment and comprises an identifier of a second handover preparation and a cell identifier of a second target cell of the target base station;
determine that that the identifier of the first handover preparation and the identifier of the second handover preparation are the same; and
perform at least one of the following at the target base station: distinguish between different handover preparations for the same user equipment based on the cell identifiers, determine the context of the user equipment based on the cell identifiers, and associate the context of the user equipment with the cell identifiers, wherein the first and second handover preparations are for a conditional handover of the user equipment.

18. The apparatus of claim 17, wherein the at least one memory and the computer program code are further configured to, with the at least one processing core, cause the apparatus at least to:
receive the first handover preparation request and the second handover preparation request in a single message from the source base station.

19. The apparatus according to claim 17, wherein the first and second handover preparations are for a conditional handover of the user equipment.

* * * * *